Figure 1:
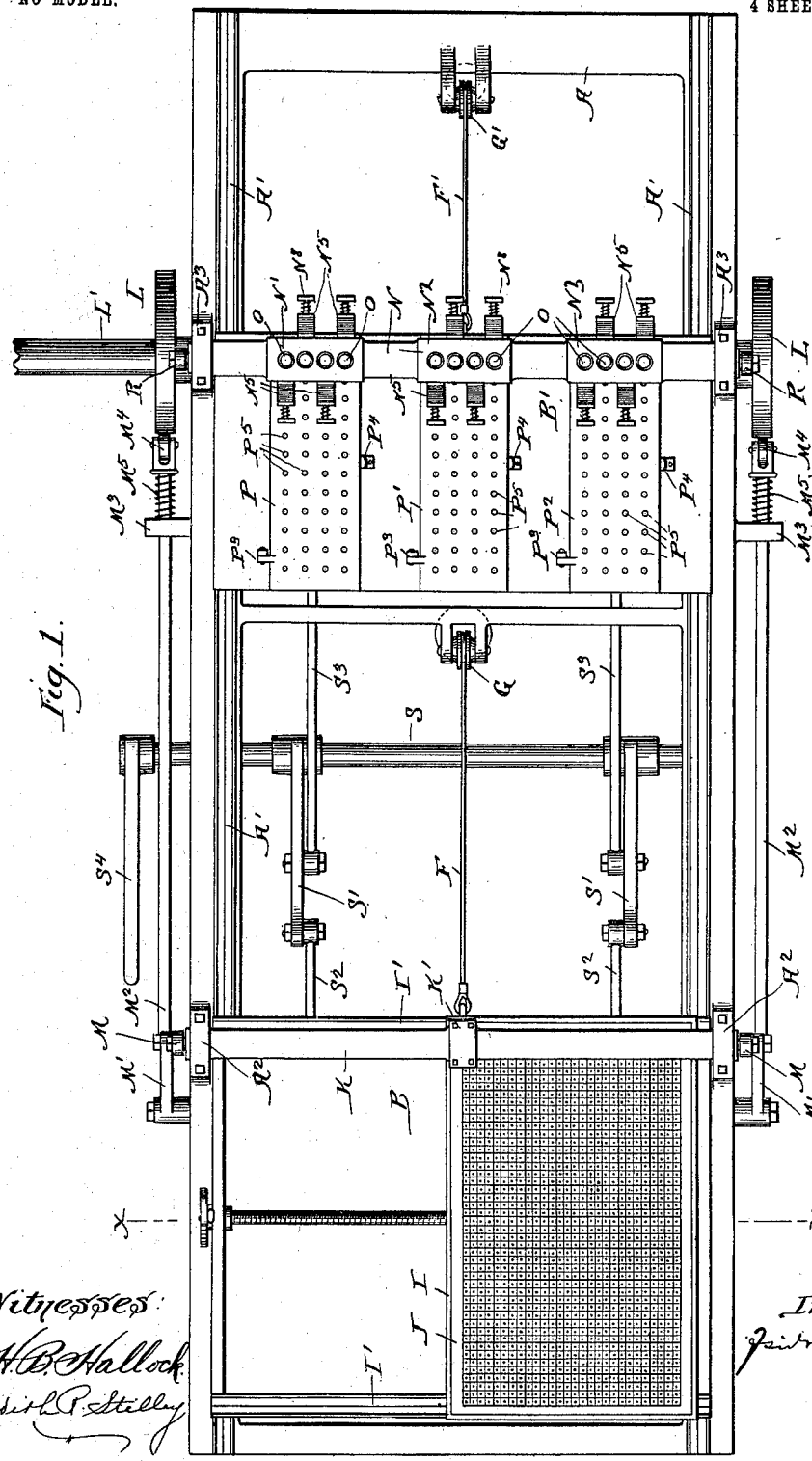

No. 732,948. PATENTED JULY 7, 1903.
I. KITSEE.
APPARATUS FOR MAKING DESIGNS AND JACQUARDS FOR SAME.
APPLICATION FILED JUNE 7, 1900.
NO MODEL. 4 SHEETS—SHEET 1.

Witnesses:
H. B. Hallock
Edith P. Stilly

Inventor:
Isidor Kitsee

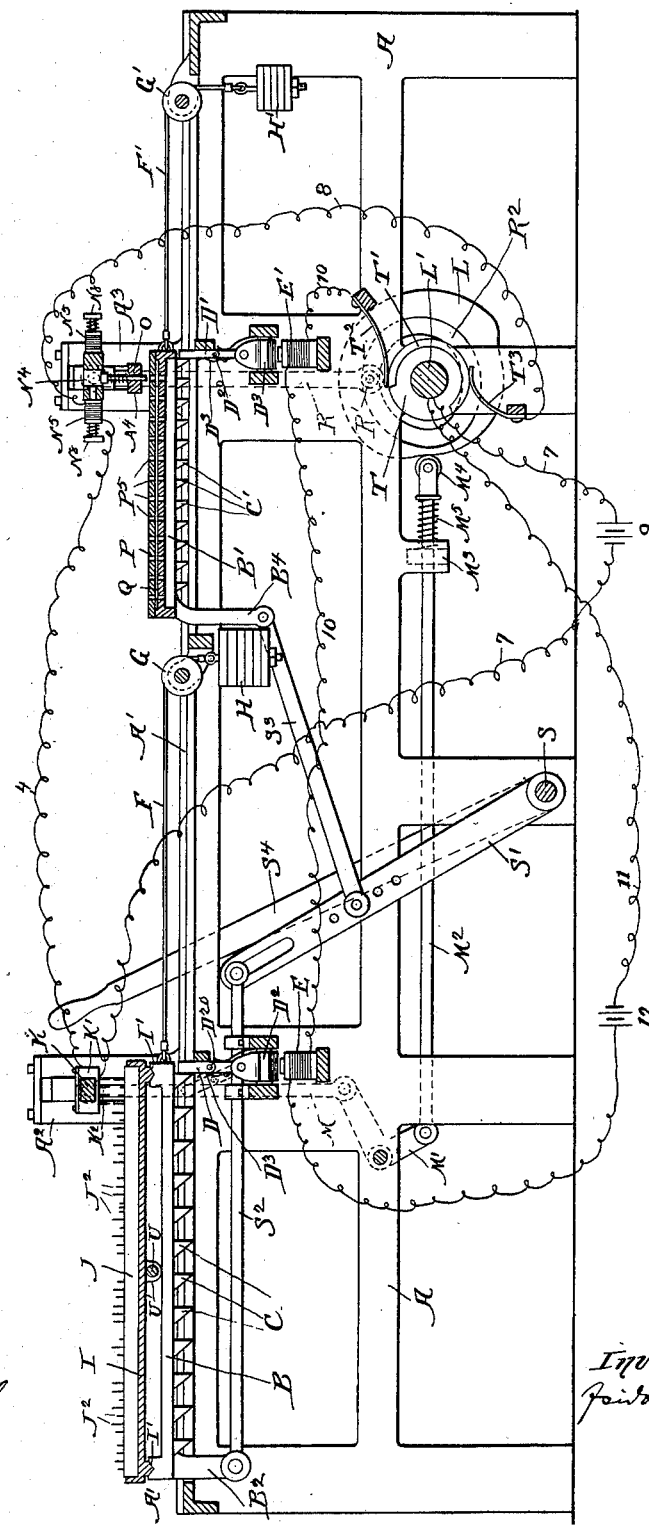

No. 732,948. PATENTED JULY 7, 1903.
I. KITSEE.
APPARATUS FOR MAKING DESIGNS AND JACQUARDS FOR SAME.
APPLICATION FILED JUNE 7, 1900.
NO MODEL. 4 SHEETS—SHEET 3.
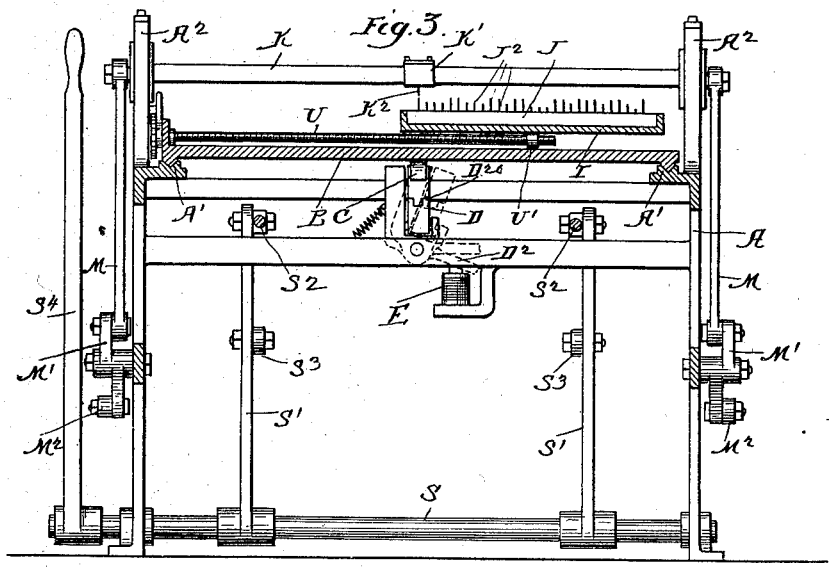
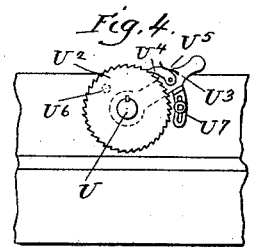
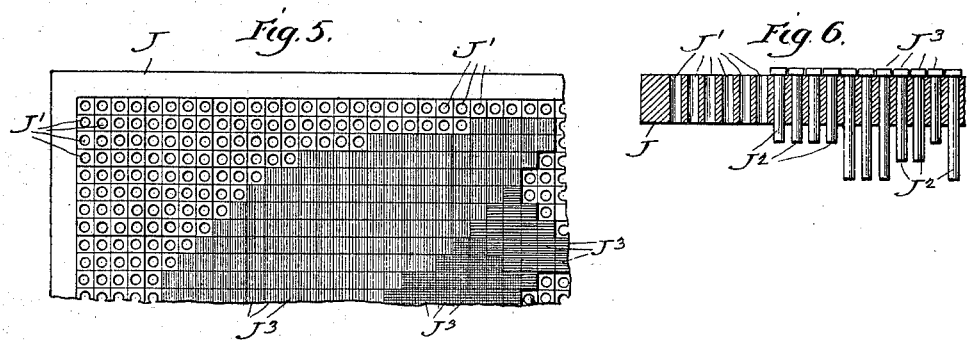
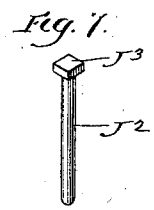
Witnesses. Inventor.

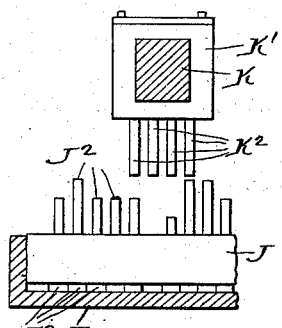
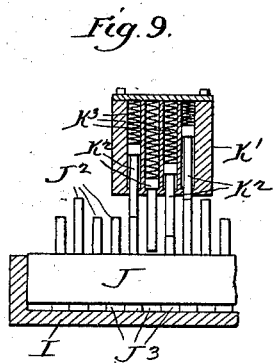
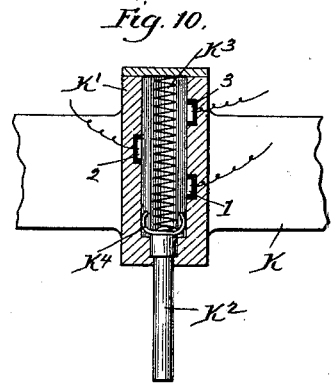
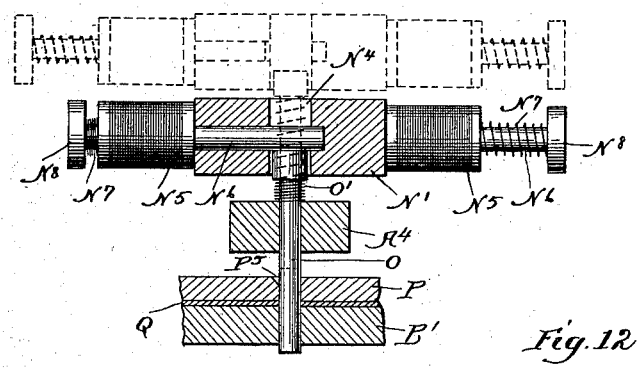
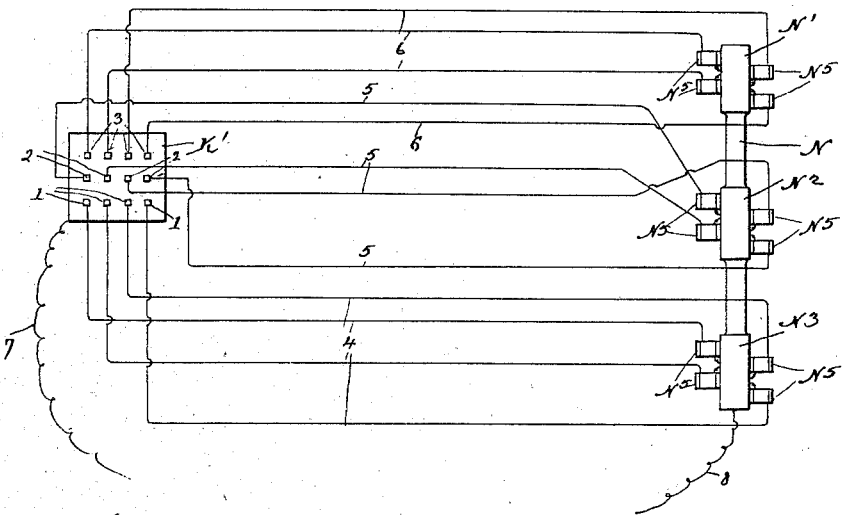

No. 732,948. Patented July 7, 1903.

UNITED STATES PATENT OFFICE.

ISIDOR KITSEE, OF PHILADELPHIA, PENNSYLVANIA.

APPARATUS FOR MAKING DESIGNS AND JACQUARDS FOR SAME.

SPECIFICATION forming part of Letters Patent No. 732,948, dated July 7, 1903.

Application filed June 7, 1900. Serial No. 19,445. (No model.)

*To all whom it may concern:*

Be it known that I, ISIDOR KITSEE, of the city and county of Philadelphia, State of Pennsylvania, have invented certain new and useful Improvements in Apparatus for Making Designs and Jacquards for Same, of which the following is a specification.

My invention relates to apparatus for making designs and jacquards for the same.

The objects of my invention are, first, to reproduce on so-called "point-paper" a design to be used in the process of weaving; second, to produce the original jacquards from such design.

It is well known that designs made for the purpose of being reproduced in weaving have to be first reproduced on so-called "point-paper"—paper divided by lines into small squares. It is unnecessary for me to go into detail, as this branch of work is well known to persons versed in the art. The difficulty of correcting an error made on this point-paper is so great that if two or three such errors appear on one design the draftsman rather commences his work afresh than to make corrections on the old one. More specially is this the case if the design consists of three or more colors.

The first part of my invention has reference to the making of these design-cards. Instead of the lined sheet of paper I use a block, preferably made of metal—such, for instance, as brass. This block is provided with perforated squares, each square being equivalent to a square on the point-paper. This block is also provided with square-headed pins, the square head being of such dimension as to fit snugly into one of the squares of the metal block, the top of the head being colored. Normally—that is, before the design is made—the pins, which I call "design-pins," are placed every color separately in boxes or holders. The draftsman instead of drawing the design simply makes the design with the aid of these pins, as will hereinafter be more fully described.

The second part of my invention consists in automatically stamping perforations in jacquards with the aid of these pins, the length of the lower parts of which differs, the length of the pins of one color being greater or less than the length of the pin of a second color. This method will be more fully described in the explanation following.

Referring to the drawings, Figure 1 is a plan view of the entire machine. Fig. 2 is a longitudinal section of the machine. Fig. 3 is a section on the line X X of Fig. 1. Fig. 4 is a detailed side elevation of the ratchet mechanism for revolving the screw. Fig. 5 is a plan view of a portion of the design-plate, a portion of a design being represented thereon. Fig. 6 is a section of the design-plate, showing a few of the design-pins in place. Fig. 7 is a perspective view of one of the design-pins. Fig. 8 is a detailed cross-section of a portion of the machine, showing in elevation the design-plate, pins, and the block containing contact-pins, which operate in conjunction with the design-pins. Fig. 9 is a similar view to Fig. 8, showing in section the block containing the contact-pins and in the lowest position it would assume when operating upon the design-pins. Fig. 10 is an enlarged section of the block containing the contact-pins, taken at right angles to Figs. 8 and 9. Fig. 11 is an enlarged detail cross-section of the punching mechanism, the punch being shown in its lowest position in full lines and in its highest and normal position in dotted lines. Fig. 12 is a diagram of the wiring necessary for operating a three-color design.

The operation of the machine is as follows: Upon the main frame A of the machine are located the tracks A', upon which slide the carriages B and B'. The carriage B has on its under surface the teeth C. D is an escapement, of any suitable construction, here shown as the well-known type-writer escapement, the rocking of said escapement being accomplished by means of the armature $D^2$, which is operated by the magnet E. Whenever the escapement is rocked in the position as shown in Fig. 3 in dotted lines, the carriage B will be moved forward one step by means of the cable F, which passes over the pulley G and is secured to the weight H. The carriage B' is operated in precisely the same manner by means of the teeth C', the escapement D', the armature $D^3$, magnet E', cable F', pulley G', and weight H'. Located on the carriage B and extending crosswise to the same are the tracks I', upon which is adapted to slide the plate-holder I. This plate-holder I is adapted to receive the design-plate J. This design-plate J has its surface ruled as the ordinary design-papers now in use, but within every small square a hole J' is bored or punched through the plate J. $J^2$ represents pins adapted to fit snugly within the holes J' and having square heads $J^3$, the same size as the small squares ruled upon the surface of the plate J. These pins are of different lengths, according to the different colors, and the upper surface of the square heads will be painted that color, so that instead of filling up and painting in the colors, as is done now on the design-paper, a pin is inserted in the hole of each square, so that the design when finished will have the same appearance as the painted design, but allowing more freely for mistakes to be corrected than when painted upon the design-paper. The design-plate, having the design thereon completed, is then turned over and placed within the plate-holder I, with the different-length pins extending upward. For each longitudinal row in the design one jacquard has to be punched and one card for each color in the row. The machine here illustrated shows a three-colored design, so that for each row three cards will have to be punched. For the purpose of doing this automatically, punching the three cards at one time, I provide the cross-head K, which slides within the upright guide $A^2$ of the machine. In the middle of this cross-head K is the contact-box K'. In this contact-box are located the pins for forming the contacts, there being as many pins as there are holes desired to be punched crosswise of the jacquard-cards, here showing four for the purpose of better illustration, there usually being from eight to twelve. Each of these contact-pins $K^2$ slides within its own guideway, and said pins have located above them the springs $K^3$. Upon each side of the machine and secured to the cross-head K are the pitmen M. The lower end of each of these pitmen is secured to one member of the bell-crank lever M'. To the other end of each of these bell-crank levers is secured the reciprocating rod $M^2$. The other end of each rod $M^2$ has located thereon the roller $M^4$. The spring $M^5$ pressing against the lug $M^3$ tends to keep this roller $M^4$ in contact with the cam L, which revolves continuously with the shaft L', so that it will be seen that the cross-head K will be depressed once upon every revolution of the cam L. Whenever the cross-head is depressed, the contact-pins $K^2$ will come in contact with the design-pins $J^2$, and these design-pins being of different lengths, representing different colors, will necessarily push these contact-pins different distances upward within their guideways, and thereby when the cross-head K is in its lowest position the spring-contacts $K^4$ upon the heads of the pins $K^2$ will rest on either one of the contacts 1, 2, or 3, located within the guideway of the pins $K^2$. Upon the carriage B' are located the holders P, P', and $P^2$ for holding the three jacquard-cards. These cards can be held in any suitable manner, here shown as clamped between two surfaces hinged at the point $P^3$ and held in the spring-catches $P^4$. There are holes $P^5$ in these two surfaces corresponding to the largest number of holes that could be put in the jacquard-cards. N is a cross-head which slides within the guideways $A^3$ of the machine. N' $N^2$ $N^3$ are blocks located upon this cross-head, each block having four holes $N^4$ therethrough. Located beneath each one of these holes and adapted to slide within the stationary piece $A^4$ are the punchers O. These punchers are held upward in their normal position by the springs O'. The cross-head N is adapted to be raised and lowered by means of the pitmen R, secured on each side of the machine, these pitmen having at the lower end the roller R', adapted to work within the cam-slot $R^2$ of the cam L. Now it is obvious that if the cross-head N is raised and lowered the punchers O will simply pass through the holes $N^4$, and thus not operate said punchers at all; but for the purpose of operating certain punchers I provide opposite each hole $N^4$ magnets $N^5$. Passing through these magnets and into the blocks N', $N^2$, and $N^3$ are the rods $N^6$. These rods terminate in the armatures $N^8$ and are held outwardly in their normal positions by the springs $N^7$, and when any of the magnets $N^5$ is energized the rod $N^6$ will thus be shot across the hole $N^4$ and above the puncher O, so that when the cross-head N is lowered the punchers will be carried downward also, and thereby punch the desired holes in the jacquard-card. When the cross-head K is lowered, as before described, and all the contact-pieces $K^4$ are pushed in upon the proper contact-strips through 1, 2, or 3, a circuit will be established by means of the drum T, which is located upon the shaft L' and continuously revolved, a portion of this drum T having insulation on its surface, as indicated at T'. When this drum T passes upon the contact-springs $T^3$, a circuit will be established from the contact-points 1, 2, and 3 to their respective magnets $N^5$, from thence to the contact-spring $T^3$ through the wire 8, and then from the shaft L' by means of the wire 7 back to the cross-head K. Thus it will be seen that each different length of the design-pins $J^2$ represents a different color, and the three different holders P, P', and $P^2$ will also represent a different color, so that all the contact-points 1 will be connected to the different magnets located upon the block $N^3$ and the contact-points 2 will be connected to the magnets of the block $N^2$ and the contact-points 3 will be connected to the magnets of the block N'. Thus it will be seen that the three different colors will be punched at the same time. Q represents the jacquard-card. When one row upon the design is finished, new jacquard-cards are put within the holders P, P', and $P^2$, and the design-plate and the card-holders are returned to their initial position by means of the levers S', S², S³, and S⁴. The hinge D²⁰ on the escapement D is provided with the spring D³ to allow for this return. Of course when the plate is so returned it is necessary to start on a different row from the row just completed, and to so move the plate laterally the required distance I provide the screw U, which is threaded through the ear U', secured to the under side of the plate-holder I. This screw U is secured against lateral movement of the carriage B and has secured to its outer end the ratchet-wheel U². U³ is a lever adapted to rotate upon the screw U and has pivoted thereto the pawl U⁴. U⁵ is a spring for the purpose of holding the pawl U⁴ to the ratchet-wheel U². U⁶ is a stop for limiting the ratchet-lever in one direction, and U⁷ is a second stop for limiting the lever in the other direction, so that when the plate is returned to its initial position the operator simply throws the lever over to the limit, which is the stop U⁶. Then the plate is ready for another row.

Of course the escapement D and D' should operate only when the punchers O and the cross-head K are at rest in their highest position. To accomplish this, I provide the spring T², which is connected by wire 10 with the magnets E and E', and the wire 11 runs from these magnets to the shaft L'. In this circuit is the battery 12. When the metallic portion of the drum T comes in contact with the spring T², a circuit will be established, and thereby energizes the magnets E and E'.

Of course it is obvious that any number of colors can be represented, it merely being necessary to have the different-length pins for the different colors and one contact for each length of pin in the box K', and of course for as many colors as the machine is built for there will have to be that many card-holders and series of magnets; but if the machine is built for, say, ten colors that machine would operate with two colors or any number, in fact, up to the limit, ten, so that in practice it would be preferable to build the machine for the largest possible number of colors that are generally used in a design.

It is understood that all parts of the electrical circuits, movable as well as stationary, are provided with the necessary insulation, so that the operation of one circuit should not interfere with the operation and working of the other circuits.

It is sometimes necessary to store away for later use designs made on point-paper, and as it would be too costly and inconvenient to store the plates and pins I provide the head of each pin with a letter designating the color of same—as, for instance, "W" for white, "R" for red, &c. Every pin-head, therefore, will be provided with a letter, and if it is desired to file the design it is only necessary to ink in the letters and take impressions from the same in the same manner as is now done in hand-printing.

Having now described my invention, what I claim as new, and desire to secure by Letters Patent, is—

1. A design-plate, comprising a perforated block, and removable pins arranged in the perforations of said block and colored to represent the different colors of the design, the shanks of said pins being longer than the thickness of the block to project beyond the face of the latter, said shanks also being of varying lengths in accordance with the colors the pins are designed to represent.

2. A design-plate, comprising a perforated block, and removable pins arranged in the perforations of said block and representing the contour of the design, said pins being colored to represent the different colors of the design and having their shanks of greater length than the thickness of the block to project beyond the face of the latter, said shanks also being of varying lengths in accordance with the colors the pins are designed to represent.

3. A device for automatically producing jacquards which consists in the following instrumentalities: a design-plate provided with pins or plugs, a circuit containing a source of electricity and electromagnetic devices, connected to contact devices and said pins respectively, and means for making and breaking the circuit and actuating the electromagnetic devices, in accordance with the design, with which the design-plate is provided.

4. In a machine of the class described, the combination with a design-plate having a series of removable pins constituting the design, of a holder adapted to receive a jacquard, circuit-closing devices operatively related to the pins of the design-plate, punching devices operatively related to the jacquard for duplicating the design therein and controlled by said circuit-closing devices, and means for actuating said punching devices.

5. In a machine of the class described, the combination with a design-plate having a series of removable pins constituting the design, of a holder adapted to receive a jacquard, said plate and holder being adapted to move in unison, circuit-closing devices operatively related to the pins of the design-plate, punching devices operatively related to the jacquard for duplicating the design therein and controlled by said circuit-closing devices, means for actuating said punching devices, and means for operating the design-plate and holder in unison.

6. In a machine of the class described, the combination with a design-plate having a series of pins constituting the design, said pins being of varying length, of a holder adapted to receive a jacquard, circuit-closing devices operatively related to the pins of the design-plate, punching devices operatively related to the jacquard for duplicating the design therein and controlled by said circuit-closing devices, and means for actuating said punching devices.

7. In a machine of the class described, the combination with a design-plate having a series of pins constituting the design, of a holder adapted to receive a jacquard, circuit-closing devices operatively related to the pins of the design-plate, punching devices operatively related to the jacquard for duplicating the design therein and controlled by said circuit-closing devices, means for actuating said punching devices, means for restraining the movement of the design-plate and the jacquard-holder, and means for releasing said restraining means.

8. In a machine of the class described, the combination with a design-plate having a series of pins constituting the design, of a holder adapted to receive a jacquard, circuit-closing devices operatively related to the pins of the design-plate, punching devices operatively related to the jacquard for duplicating the design therein and controlled by said circuit-closing devices, means for actuating said punching devices, means for restraining the movement of the design-plate and the jacquard-holder, and electromagnetic means for releasing said restraining means.

9. In a machine of the class described, the combination with a design-plate having a series of pins constituting the design, of a holder adapted to receive a jacquard, a vertically-movable cross-head arranged adjacent to said design-plate, circuit-closing devices carried by said cross-head and operatively related to the pins of said plate, punching devices operatively related to the jacquard for duplicating the design therein, a vertically-movable cross-head arranged adjacent to said punching devices, and means carried by said cross-head and controlled by said circuit-closing devices for actuating said punching devices.

10. In a machine of the class described, the combination with a design-plate having a series of pins constituting the design, of a holder adapted to receive a jacquard, a vertically-movable cross-head arranged adjacent to said design-plate, circuit-closing devices carried by said cross-head and operatively related to the pins of said plate, punching devices operatively related to the jacquard for duplicating the design therein, a vertically-movable cross-head arranged adjacent to said punching devices, and electromagnetic means carried by said cross-head and controlled by said circuit-closing devices for actuating the punching devices.

11. In a machine of the class described, the combination with a design-plate having a series of pins constituting the design, of a holder adapted to receive a jacquard, a vertically-movable cross-head arranged adjacent to said design-plate, circuit-closing devices carried by said cross-head and operatively related to the pins of said plate, punching devices operatively related to the jacquard for duplicating the design therein, a vertically-movable cross-head arranged adjacent to said punching devices, means carried by said cross-head and controlled by said circuit-closing devices for actuating said punching devices, means for restraining the movement of the design-plate and the jacquard-holder, and means for releasing said restraining means.

12. In a machine of the class described, the combination with a design-plate having a series of pins constituting the design, of a holder adapted to receive a jacquard, a vertically-movable cross-head arranged adjacent to said design-plate, circuit-closing devices carried by said cross-head and operatively related to the pins of said plate, punching devices operatively related to the jacquard for duplicating the design therein, a vertically-movable cross-head arranged adjacent to said punching devices, means carried by said cross-head and controlled by said circuit-closing devices for actuating said punching devices, and electromagnetic means for releasing said restraining means.

13. In a machine of the class described, the combination with the machine-frame, of a pair of carriages mounted thereon, a design-plate mounted upon one of said carriages and provided with a series of pins constituting the design, a jacquard-holder mounted upon the other of said carriages, circuit-closing devices operatively related to the pins of the design-plate, punching devices operatively related to the jacquard-holder for duplicating the design in the jacquard, said punching devices being controlled by said circuit-closing devices, a shaft carried by the machine-frame, intermediate connections between said shaft and the circuit-closing and punching devices for operating the same from said shaft, an electric circuit including said shaft and the circuit-closing and punching devices, a second electric circuit also including said shaft, means for restraining the movement of said carriages, and electromagnetic devices included in said second circuit for releasing said restraining means.

In testimony whereof I hereby sign my name, in the presence of two subscribing witnesses, this 31st day of May, A. D. 1900.

ISIDOR KITSEE.

Witnesses:
EDITH R. STILLEY,
WALLACE B. ELDRIDGE.